United States Patent
Daniel

Patent Number: 5,979,622
Date of Patent: Nov. 9, 1999

[54] POWER TAKE-OFF RELEASE MECHANISM

[76] Inventor: Lee R. Daniel, P. O. Box 837, Battleboro, N.C. 27809

[21] Appl. No.: 08/702,989

[22] Filed: Aug. 28, 1996

Related U.S. Application Data

[60] Provisional application No. 60/005,455, Oct. 16, 1995.
[51] Int. Cl.[6] .......................... B60K 41/22; F16H 37/00
[52] U.S. Cl. ........................ 192/3.63; 192/3.54; 74/11; 74/481
[58] Field of Search ............................ 192/3.51, 3.54, 192/3.63; 74/479.01, 481, 11

[56] References Cited

U.S. PATENT DOCUMENTS

| | | | |
|---|---|---|---|
| 2,277,312 | 3/1942 | Fehr .......................................... | 74/512 |
| 4,040,306 | 8/1977 | Jensen ................................... | 74/481 X |
| 4,608,879 | 9/1986 | Ishida et al. .......................... | 74/481 X |
| 5,197,347 | 3/1993 | Moffitt et al. ............................. | 74/481 |
| 5,205,181 | 4/1993 | Wright ................................... | 74/481 X |
| 5,467,663 | 11/1995 | Trowbridge ............................... | 74/481 |

*Primary Examiner*—Charles A. Marmor
*Assistant Examiner*—Saúl J. Rodríguez
*Attorney, Agent, or Firm*—Mills Law Firm PLLC; Clifford F. Rey

[57] ABSTRACT

A power take-off release mechanism for automatically disengaging a power take-off unit and accessory equipment powered thereby is disclosed. The power take-off release mechanism interconnects a clutch foot pedal mechanism of a vehicle having a manual transmission to a throw out arm on the power take-off unit. The power take-off unit includes a mechanical cable linkage which functions to engage the power take-off unit in a conventional manner. Thereafter, whenever the manual clutch foot pedal is depressed to put the vehicle in gear under normal driving conditions, the power take-of mechanism of the present invention is automatically actuated to disengage the power take-off unit thereby preventing the same from being operated at higher engine revolutions under normal driving conditions. In one embodiment, the power take-off release mechanism includes a mechanical cable linkage that interconnects the clutch foot pedal with the mechanical throw out arm on the power take off unit. In an alternative embodiment, the same functions are carried out by electro-mechanical components such as switches and solenoids.

6 Claims, 6 Drawing Sheets

POWER TAKE-OFF RELEASE MECHANISM

This application claims the benefit of U.S. Provisional Application No. 60/005,455, filed Oct. 16, 1995, by Lee R. Daniel for Power Take-Off Release.

BACKGROUND OF INVENTION

FIELD OF INVENTION

This invention relates to foot pedal control mechanisms and apparatus, and more particularly, to a method for engaging and disengaging a power take-off unit associated with the transmission of a heavy duty motor vehicle.

It is well known to those skilled in the art to utilize a so-called power take-off unit in conjunction with a truck or tractor transmission to provide power to a take-off shaft independent of the drive shaft of the vehicle. The power take-off shaft is used to operate an accessory device such as a hydraulic pump or other equipment carried on the vehicle.

In the conventional practice, the power take-off shaft must be engaged and/or disengaged by manual operation of a control lever coupled to a mechanical linkage to actuate the power take-off shaft. An example of such a manually controlled power take-off control mechanism is disclosed by U.S. Pat. No. 2,175,188 to Fuller. This patent discloses a foot pedal operated linkage which directly controls cutting in of a power take-off shaft independently of the propulsion shaft of the vehicle.

A particular problem with such a power take-off control mechanism is that the same must be manually disengaged after operation of the power take-off is complete and normal operation of the vehicle's propulsion shaft is to be resumed.

Since the power take-off shaft is designed to operate at lower revolutions per minute (rpm) than the vehicle's propulsion shaft, the power take-off unit shaft and accessory pump can be severely damaged if the operator fails to disengage the same prior to operating the vehicle at normal driving speed.

Thus, the present invention provides a power take-off release mechanism that is interconnected with the vehicle clutch pedal to automatically disengage the power take-off shaft whenever the vehicle is to be operated at normal driving speeds.

DESCRIPTION OF RELATED PRIOR ART

U.S. Pat. No. 2,175,188 to Warren Fuller discloses an invention for control accessibility providing greater access for cutting-in and out one or more power driven means as from a tractor power plant.

U.S. Pat. No. 2,309,454 to Clifford M. Heller discloses a control mechanism and actuating apparatus for controlling the braking mechanism of an automotive vehicle. This invention includes a lever and clutch arrangement being so arranged that the clutching means for retaining the lever mechanism in adjusted position may be rendered effective or ineffective at will.

U.S. Pat. No. 2,455,233 to Shirley C. Copeland discloses an automatic throttle control adapted for use on tractors which is adapted to be actuated by the depressing of the tractor clutch to reduce the supply of the fuel mixture to the carburetor to cause the tractor engine to slow down to an idling speed.

U.S. Pat. No. 2,555,417 to Cebal F. Martin discloses a hand controlled clutch and brake for tractors providing a remote control connection whereby the operator of the tractor can operate the clutch and brake while standing up on the drawbar of the tractor or when standing on the ground as when the connection is being affected with a tractor drawn implement.

U.S. Pat. No. 2,277,312 to Henry Fehr discloses a foot actuated linkage terminating in a clutch operated lever and having a support adjacent the draw bar of the tractor, the clutch operating lever being directly over the center of the drawbar.

Finally, U.S. Pat. No. 4,608,879 to Mildo Ishida, et al., discloses a change speed operating apparatus for a tractor which may carry out an accelerating operation without losing the functions of a speed setting mechanism and automatically reset the speed setting mechanism at the previously set traveling speed after the acceleration.

SUMMARY OF THE INVENTION

After much research and study on the above mentioned problems, the present invention has been developed to provide a power take-off release mechanism that is interconnected with the manual clutch of a vehicle to automatically disengage the power take-off unit whenever the vehicle is to be operated at normal driving speed.

The power take-off release mechanism is mechanically coupled to an existing clutch foot pedal and includes a mechanical cable mechanism which functions to automatically disengage the associated power take-off unit anytime the vehicle clutch pedal is depressed to shift gears in order to put the vehicle in a propulsion mode.

Thus, the power take-off unit is precluded from operation during normal driving conditions thereby preventing damage and costly repairs.

In view of the above, it is the object of the present invention to provide a power take-off release mechanism for use in combination with a motor vehicle having a manual clutch which will automatically disengage the power take-off unit under normal driving conditions.

Another object of the present invention is to provide an improved heavy duty motor vehicle including the power take-off release mechanism as standard equipment.

Another object of the present invention is to provide a power take-off release mechanism in kit form which may be added on to existing vehicles without substantial modification thereof.

Another object of the present invention is to provide a power take-off release mechanism which provides a fail-safe method of preventing accidental damage to a power take-off unit and/or auxiliary equipment operated in conjunction therewith.

Another object of the present invention is to provide a power take-off release mechanism which may be manufactured at a reasonable cost and provides obvious economic advantages in reduced maintenance and repair costs.

Other objects and advantages of the present invention will become apparent and obvious from a study of the following description and the accompanying drawings which are merely illustrative of such invention.

DESCRIPTION OF THE PREFERRED EMBODIMENT

Figure 1:
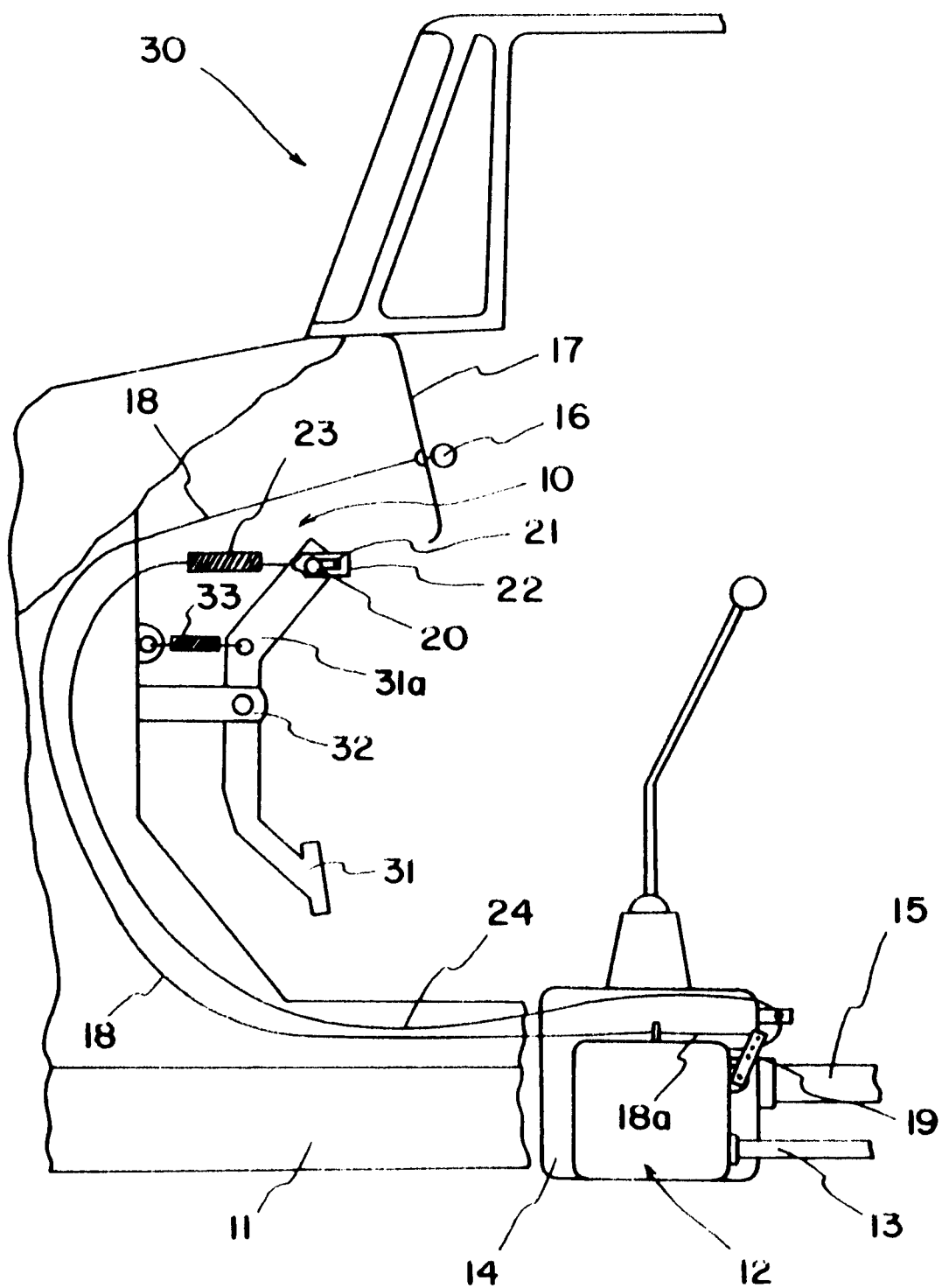
FIG. 1 is a partially cut away, side elevational view of a motor vehicle showing a manual clutch pedal mechanism having the power take-off release of the present invention installed thereon.

With reference to the drawings, a power take-off release mechanism in accordance with the present invention is shown in FIG. 1 and indicated generally at 10.

Power take-off release mechanism 10 is shown installed on a motor vehicle, indicated generally at 30, including a power plant (not shown) with a clutch (not shown) that is operated by clutch foot pedal 31 to throw the clutch out of driving connection with the power plant when clutch pedal 31 is depressed by the foot of the operator of the motor vehicle 30.

Clutch foot pedal 31 is pivotally mounted on a fulcrum bracket 32 that is fixedly attached to the frame 11 of motor vehicle 30. Pedal 31 is provided with a return spring 33 which functions to reposition pedal 31 after each shift of gears.

Since such manual clutch pedal mechanisms are well known to those skilled in the art, further detailed discussion of the same is not deemed necessary.

In addition to its primary function to throw the clutch out of driving connection with the power plant, clutch pedal 31 also functions to control the power take-off release mechanism 10 of the present invention as described hereinafter in further detail.

A power take-off unit, indicated generally at 12, including a power take-off shaft 13 is fixedly mounted to the manual transmission 14 in functional relation thereto as shown in FIG. 1. Power take-off shaft 13 extends rearwardly from the power take-off unit 12 in generally parallel relation to main propulsion shaft 15 of motor vehicle 30.

It will be appreciated that power take-off unit 12 is provided as an optional accessory on some trucks and heavy utility vehicles to supply auxiliary power for hydraulic pumps and other related equipment used in conjunction with the vehicle.

In the conventional practice, the power take-off unit 12 must be operated manually by use of a knob or lever 16 that is typically mounted on the dashboard 17 of motor vehicle 30 as shown in FIG. 1. Lever 16 is attached at one end to a mechanical cable 18 including a central core 18a that is operatively connected at the other end thereof to throw out arm 19 which is mechanically coupled to the power take-off unit 12 as more clearly shown in FIGS. 3 and 4.

Thus, the conventional practice is to engage and/or disengage the power take-off unit 12 by alternatively pulling out on lever 16 to engage the same and pushing in lever 16 to disengage the same.

Since the power take-off unit is designed to operate at generally lower revolutions per minute (rpm) than the main propulsion shaft 15, the operator of the vehicle 30 must take care to manually disengage the power take-off unit 12 before operating the motor vehicle 30 at normal driving speed. If the power take-off unit 12 together with an accessory pump driven by the same (not shown) are operated at normal driving speeds, they are susceptible to damage or even destruction requiring replacement.

Accordingly, it is desirable to provide a fail-safe means of disengaging the power take-off unit 12 automatically upon driving the vehicle. Further, in carrying out the power take-off release mechanism of the present invention, it is important not to interfere with the normal operation of the clutch foot pedal 31.

The present invention solves this problem by providing a power take-off release mechanism 10 that may be readily adapted to a motor vehicle 30 having a manual clutch and transmission 14 as illustrated in FIG. 1.

Figure 2:
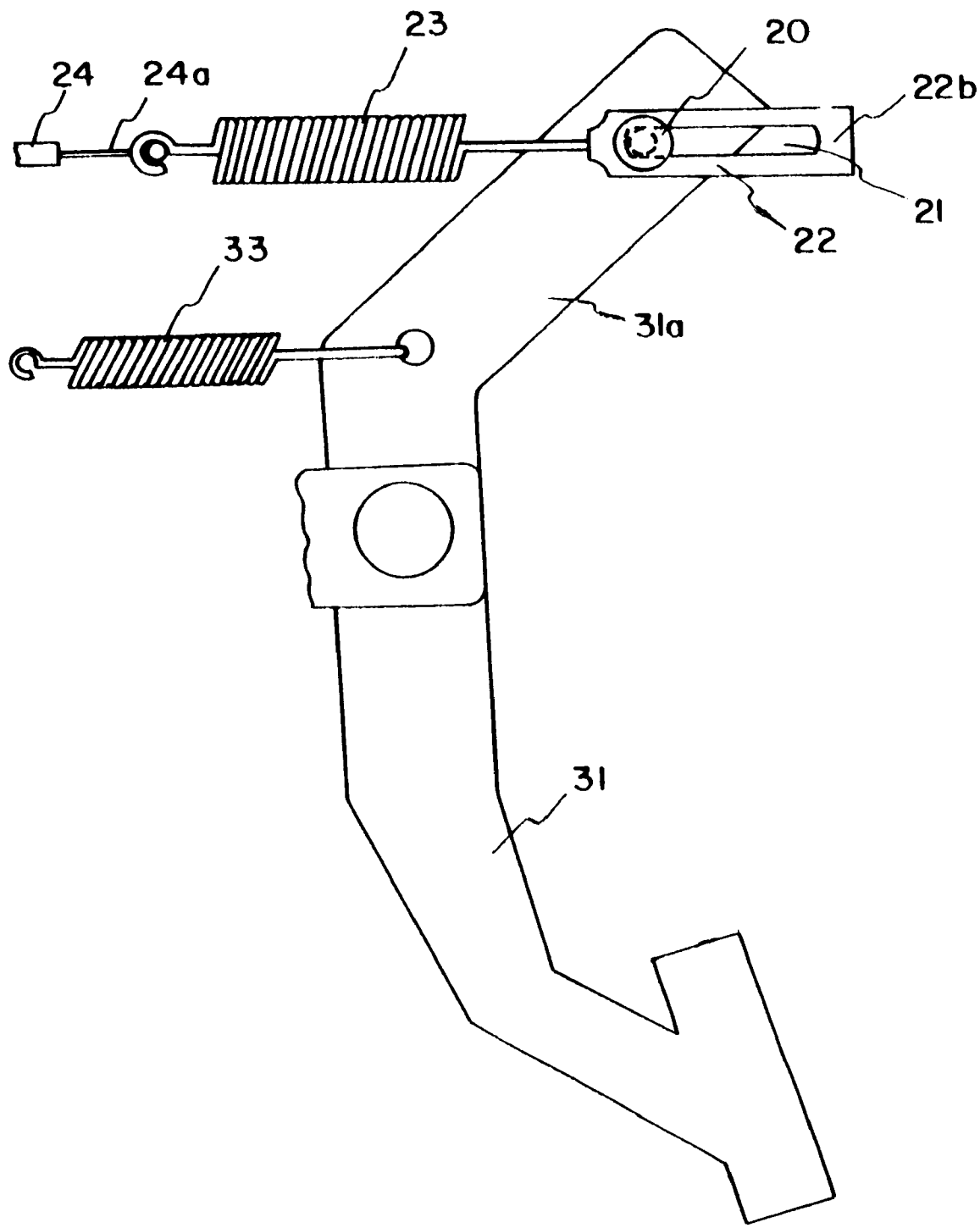
FIG. 2 is an enlarged side elevational view of a manual clutch pedal showing components of the present invention attached thereto.

In order to adapt the present invention thereto, a bolt or slidepost connector 20 is installed in the upper, return bend portion 31a of clutch pedal 31 as clearly shown in FIG. 2.

Slidepost connector 20 is installed within and slideably engages slot 21 formed in linkage fitting 22 permanently retaining the same on clutch pedal 31 as shown in FIG. 2.

Linkage fitting 22 is fixedly attached to one end of a spring compensator 23. In turn, spring compensator is mechanically coupled at an opposite end thereof to a first end of cable 24 including a central core 24a. An opposite, second end of cable 24 is adapted for attachment to throw out arm 19 as more clearly shown in FIG. 3.

Figure 3:
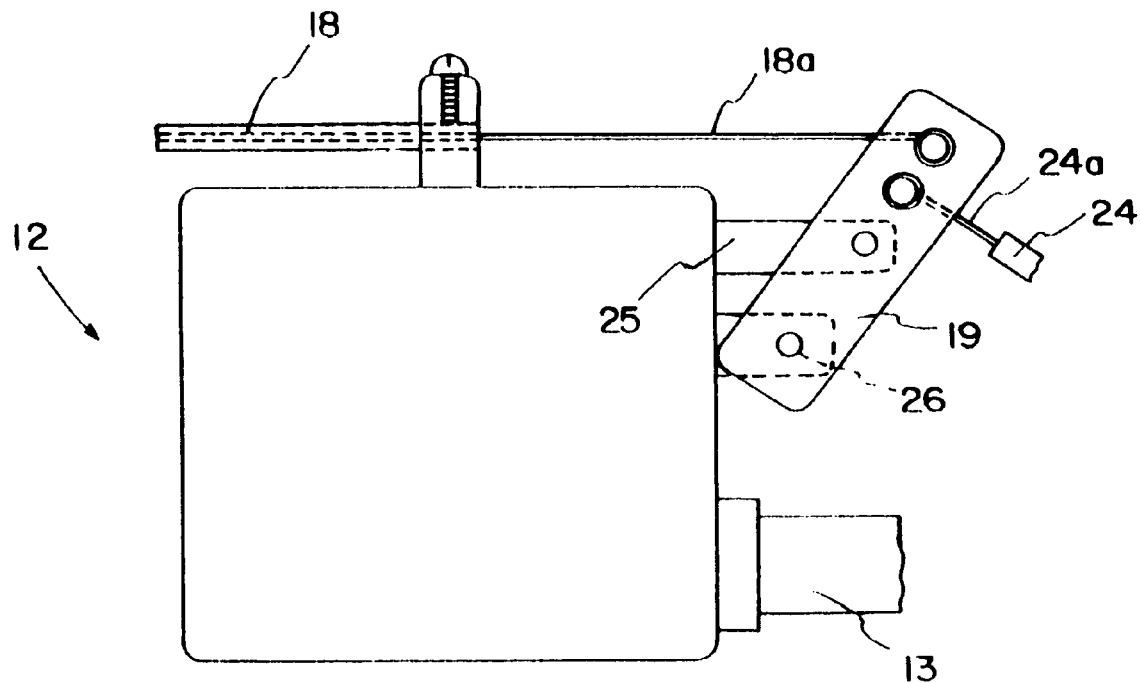
FIG. 3 is a side elevational view of a power take-off unit showing the actuating arm in a position of disengagement.

Throw out arm 19 is pivotally mounted to arm bracket 26 which is fixedly attached to an exterior surface of the power take-off unit 12 as shown in FIG. 3.

Similarly, throw out arm 19 is pivotally coupled at its approximate mid-point to actuating shaft 25 which extends from the interior of power take-off unit 12 and functions to alternately engage and/or disengage the same in order to activate power take-off shaft 13.

Since such power take-off shafts in combination with a power take-off unit are well known to those skilled in the art, further detailed discussion of the same is not deemed necessary.

In the normal operating procedure, the motor vehicle 30 is driven to the work site with the power take-off release mechanism 10 of the present invention disengaged as shown in FIGS. 1 and 3. It will appreciated by those skilled in the art that in the position shown in FIGS. 1 and 3, clutch pedal 31 is free to operate in the normal manner to throw the clutch out of driving connection with the power plant of vehicle 30 in order to shift gears within the manual transmission 14.

In this disengaged position, slidepost 20, which is positioned on the return bend portion 31a of clutch foot pedal 31 is free to travel within slot 21 each time the clutch pedal 31 is depressed and released without affecting the power take-off release mechanism 10.

Figure 4:
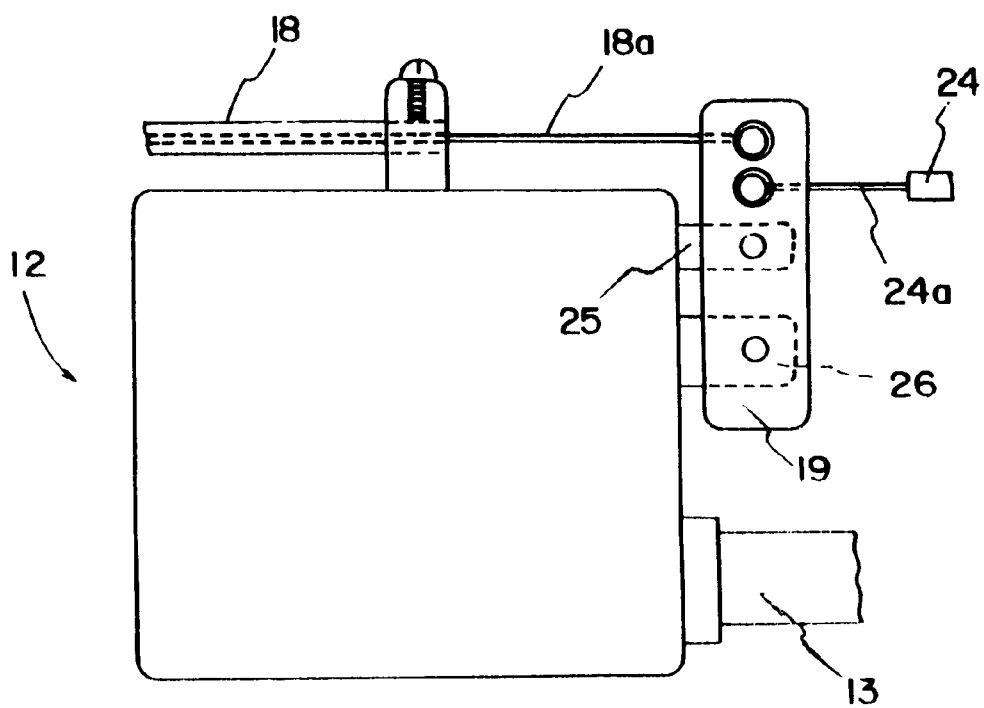
FIG. 4 is a side elevational view of a power take-off unit showing the actuating arm in a position of engagement.

Thereafter, when it is desired to operate the power take-off unit 12, the manual transmission 14 is positioned in neutral and lever 16 is pulled outwardly from dashboard 17 actuating cable core 18a to affect pivoting movement of throw out arm 19 to the generally vertical position shown in FIG. 4 thereby engaging the power take-off unit 12.

The mechanical movement of throw out arm 19 also actuates cable core 24a which momentarily expands spring compensator 23.

Figure 5:
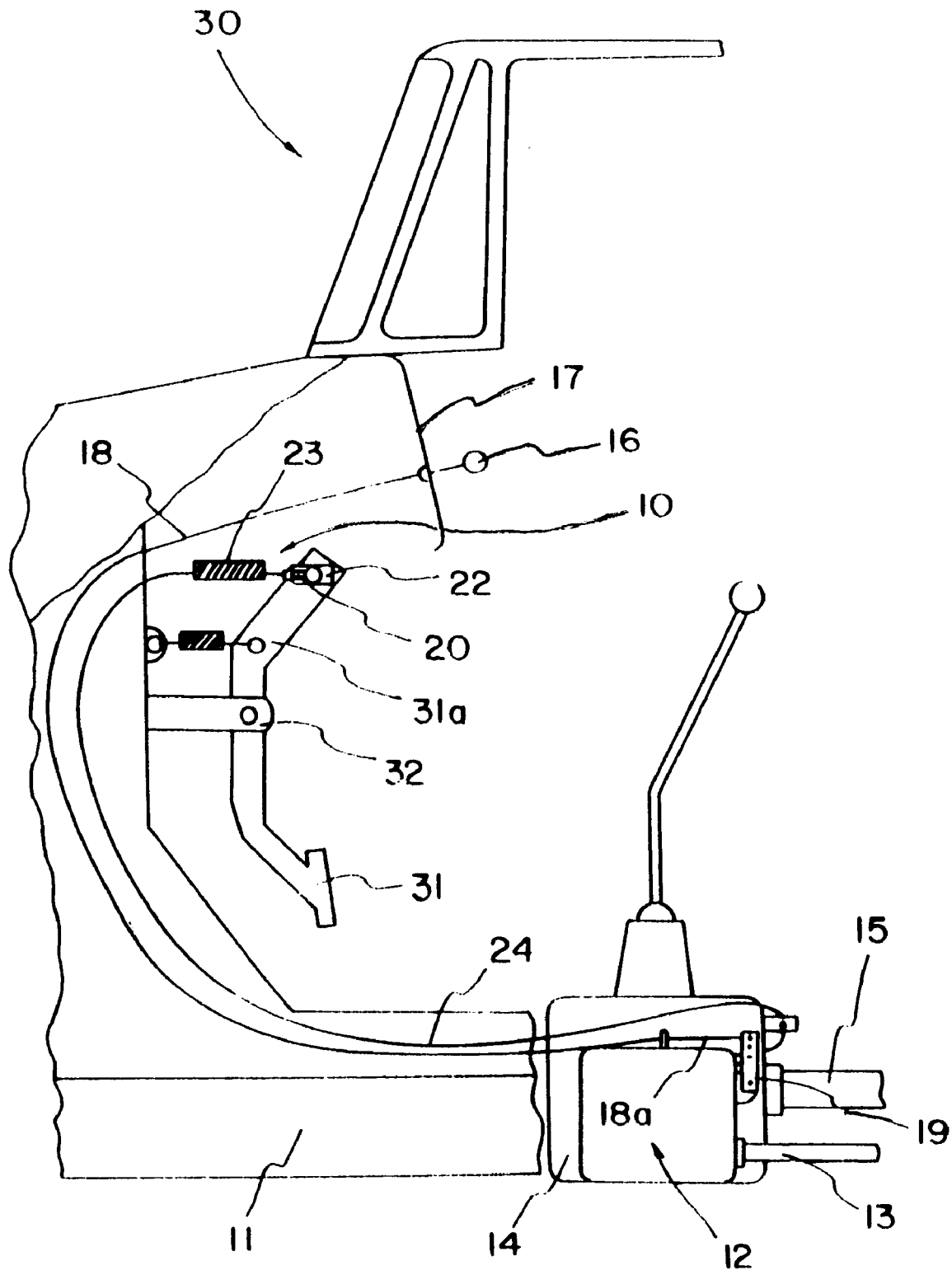
FIG. 5 is a partially cut away view of a motor vehicle showing the power take-off mechanism of the present invention in a position of engagement.
Figure 6:
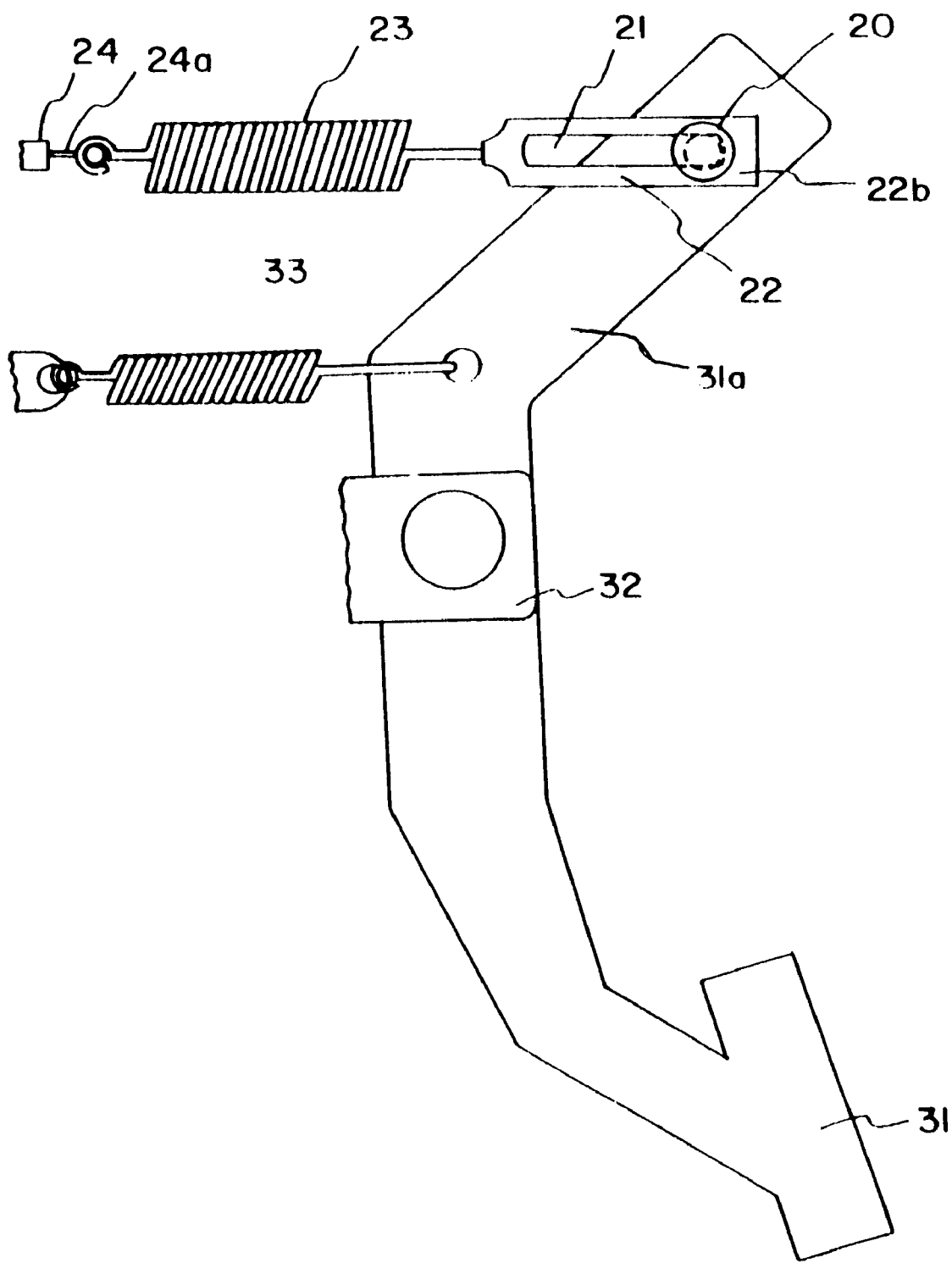
FIG. 6 is an enlarged side elevational view of the manual clutch pedal showing the power take-off release mechanism in a position of engagement.

Thereafter, spring compensator 23 instantaneously contracts drawing the distal end of slot 21 in linkage fitting 22 into contact with slidepost connector 20 as shown in FIGS. 5 and 6.

In this engaged position power is transmitted to the power take-off unit 12 and shaft 13 through transmission 14 from the power plant to operate accessory equipment such as a hydraulic pump and the like.

In the conventional practice, the operator must manually disengage the power take-off unit 12 upon completion of work and prior to driving the vehicle at normal speed. It is reiterated that severe damage to the power take-off unit 12 and related equipment may result if this occurs.

The present invention solves this problem by causing the automatic disengagement of the power take-off unit 12 if the clutch foot pedal 31 is operated at any time subsequent to engaging the power take-off unit 12.

Figure 7:
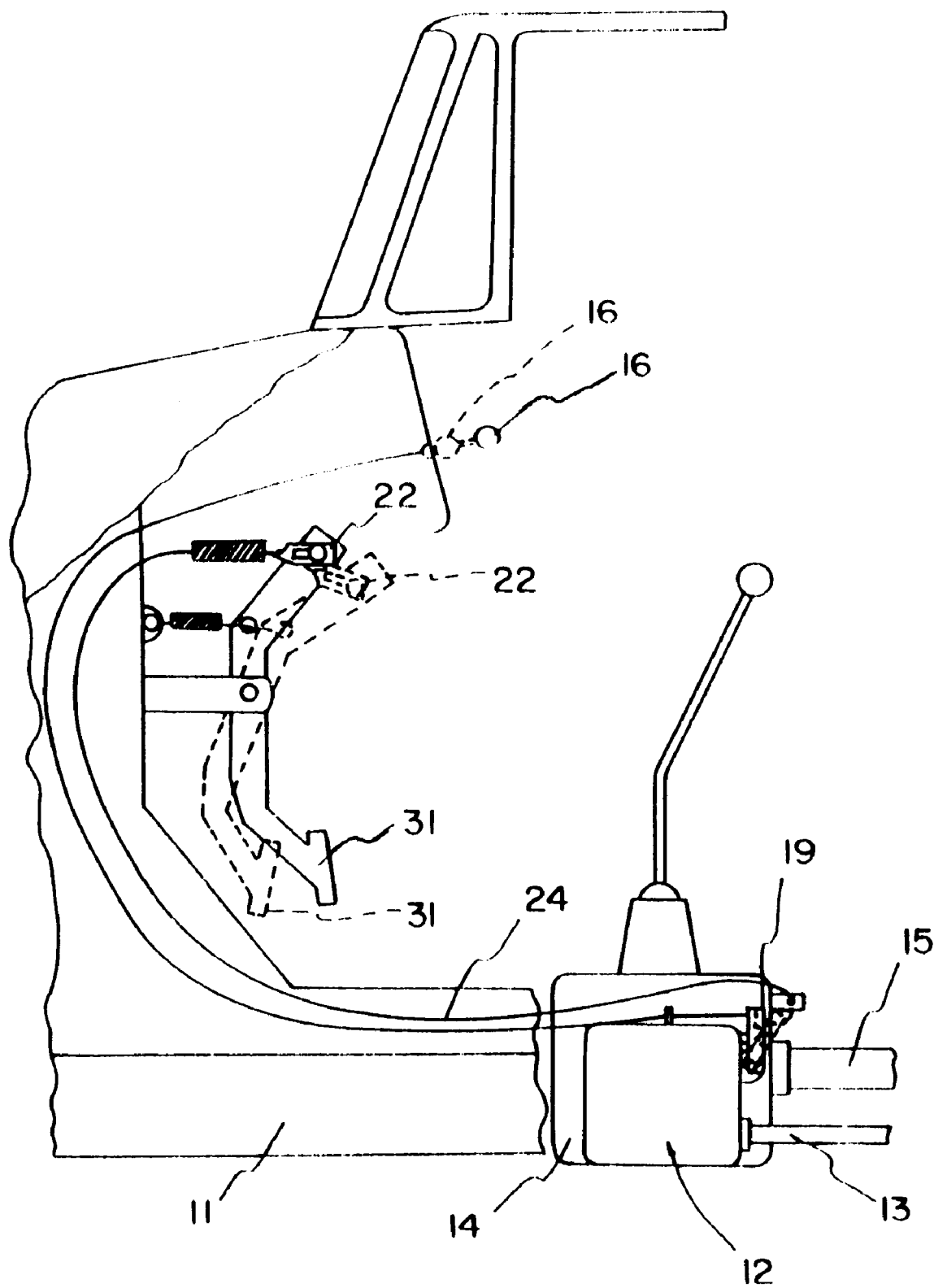
FIG. 7 is a partially cut away, side elevational view of a motor vehicle showing the operation of the manual clutch pedal together with the power take-off release mechanism in phantom outline.

It will be appreciated by referring to FIG. 7 that if the operator depresses the clutch pedal 31 to place the transmission 14 in gear with the power take-off unit 12 engaged, slidepost connector 20 makes direct contact with the distal end 22b of linkage fitting 22 actuating spring compensator 23 and thereby pulling against cable core 24a.

This mechanical movement of cable core 24a shifts throw out arm 19 from a position of engagement as shown in FIGS. 4 and 5 to its original position of disengagement as shown in FIGS. 1 and 3.

Although the present invention has been described in terms of mechanical movement for convenience, it is understood that the same functions may be carried out by electromechanical components such as switches, solenoids and the like interconnected by electrical wiring to operate the power take-off release mechanism.

From the above it can be seen that the power take-off release mechanism of the present invention provides a fail-safe method of preventing accidental damage to a power take-off unit and/or auxiliary equipment operated in conjunction therewith by automatically disengaging the same whenever the vehicle is operated in a driving mode.

Thus, the power take-off release mechanism of the present invention offers an inexpensive safety feature to protect against damage to a power take-off unit and related auxiliary equipment providing obvious economic advantages in reduced maintenance and replacement costs.

The terms "upper", "lower", "side", and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A method of automatically disengaging a power take-off unit using a power take-off release means in combination with a motor vehicle having a power plant, a manual transmission and a standard clutch mechanically connected therebetween for taking said transmission out of driving connection with said power plant, said power take-off unit including a throw out arm being movable from a position of engagement to a position of disengagement, said clutch being operated by a clutch foot pedal, said method comprising:

interconnecting said clutch foot pedal and said power take-off unit with said power take-off release means;

shifting said manual transmission to neutral gear;

engaging said power take-off unit to operate auxiliary equipment mechanically coupled thereto; and disengaging said power take-off unit by depressing said clutch foot pedal and simultaneously actuating said power take-off release means so as to move said throw out arm from said position of engagement to said position of disengagement preventing operation of said power take-off unit under normal driving conditions.

2. The method of claim 1 wherein the step of interconnecting further includes the steps of:

installing a slidepost connecting means on said clutch foot pedal;

attaching a spring compensating means to said slide post connecting means in functional relation thereto; and connecting a mechanical linkage means at one end thereof to said spring compensating means and to said throw out arm at an opposite end thereof.

3. An improved heavy duty motor vehicle having a power plant, a manual transmission, and a manually operated clutch operably connected therebetween for taking said transmission out of driving connection with said power plant; said clutch being operated by a clutch foot pedal, said vehicle further including a power take-off unit being operably connected to said transmission and being adapted for providing power to accessory equipment carried on said vehicle, said unit being activated by throw out arm means being operably connected to said unit and being moveable from a position of engagement to a position of disengagement by mechanical linkage means, said improvement comprising:

power take-off release means interconnecting said clutch foot pedal and said throw out arm, said release means moving said throw out arm to said position of disengagement whenever said clutch foot pedal is depressed with said power take-off unit in operation.

4. The improved motor vehicle of claim 3 wherein said power, take-off release means includes:

a slide post connecting means being mechanically coupled at one end thereof to said clutch foot pedal in functional relation thereto;

a spring compensating means being mechanically coupled to an opposite end of said slide post connecting means in functional relation thereto; and a mechanical cable being mechanically coupled to said spring compensator at one end thereof and to said throw out arm at an opposite end thereof and being arranged so that said throw out arm is moved to said position of disengagement whenever said clutch foot pedal is depressed while said power take-off unit is in operation.

5. The improved motor vehicle of claim 4 wherein said slidepost connecting means is installed on an upper return bend portion of said clutch foot pedal.

6. The improved motor vehicle of claim 5 wherein said spring compensating means is a coiled expansion spring.

* * * * *